No. 824,472. PATENTED JUNE 26, 1906.
G. ERICSON.
BUTTER CUTTER.
APPLICATION FILED MAR. 10, 1906.
2 SHEETS—SHEET 1.
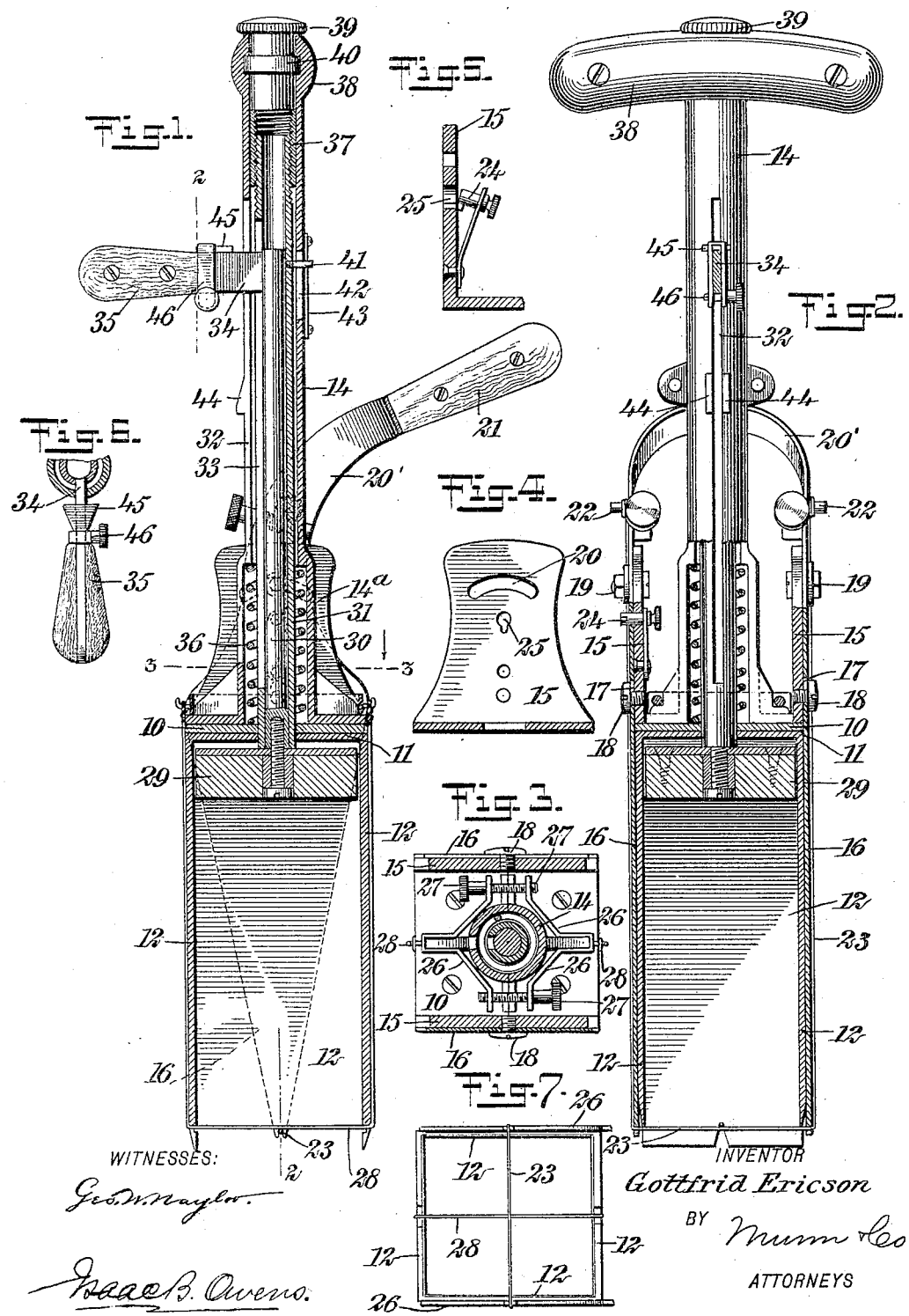
WITNESSES:
Geo. W. Naylor.
Isaac B. Owens.
INVENTOR
Gottfrid Ericson
BY Munn & Co
ATTORNEYS No. 824,472.
PATENTED JUNE 26, 1906.
G. ERICSON.
BUTTER CUTTER.
APPLICATION FILED MAR. 10, 1906.
2 SHEETS—SHEET 2.
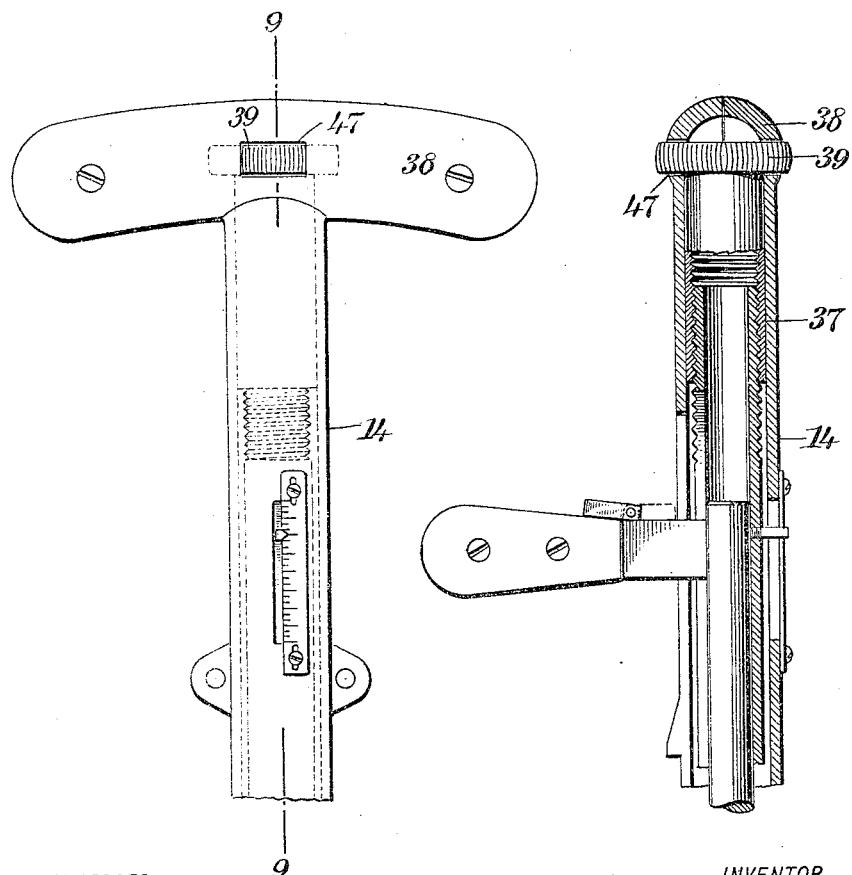
WITNESSES:
INVENTOR
Gottfrid Ericson
BY
ATTORNEYS

UNITED STATES PATENT OFFICE.

GOTTFRID ERICSON, OF NEW YORK, N. Y.

BUTTER-CUTTER.

No. 824,472.   Specification of Letters Patent.   Patented June 26, 1906.

Application filed March 10, 1906. Serial No. 305,244.

*To all whom it may concern:*

Be it known that I, GOTTFRID ERICSON, a citizen of the United States, and a resident of the city of New York, borough of Brooklyn, in the county of Kings and State of New York, have invented a new and Improved Butter-Cutter, of which the following is a full, clear, and exact description.

The invention relates to a device for cutting and simultaneously measuring butter. It is particularly useful in retail grocery trade and also for hotels and restaurants.

The object of my invention is to enable butter to be conveniently separated in prints or blocks from the rest of the butter in the tub or other package, the prints being of predetermined weight, thus dispensing with weighing the butter.

It is also an object of my invention to provide improved devices for adjusting the butter-cutter so that the weight of the butter separated may be varied to any quantity.

A further object is to enable the device to be used for cutting butter into small blocks, such as are used in restaurants for table service.

Various other features are involved and all will be fully set forth hereinafter and particularly pointed out in the claims.

Reference is to be had to the accompanying drawings, which illustrate as an example the preferred embodiment of my invention, in which drawings—

Figure 1 is a central longitudinal section of the device. Fig. 2 is an elevational view with parts in section on the line 2 2 of Fig. 1. Fig. 3 is a sectional plan on the line 3 3 of Fig. 1. Fig. 4 is a detail view of one of the frame-walls of the device. Fig. 5 is a sectional view showing the dog for locking the side cutting-arms and attached wire. Fig. 6 is a sectional plan of the handle, showing the stop by means of which the capacity of the device may be reduced. Fig. 7 is an end view showing the arrangement of the wire which is employed when the butter is to be cut in small blocks for restaurant and hotel use. Fig. 8 is a side view of a modification, and Fig. 9 is a section thereof on the line 9 9 of Fig. 8.

Referring to Figs. 1 to 7, the frame of the device consists of a plate 10, to the under side of which is fastened the connecting or middle portion 11 of the four side cutting-walls 12. Fastened to the frame or body plate 10 is a tubular handle 14, and at each side of the handle are arranged frame-walls 15, which are also fastened to the body-plate 10. The side cutting-arms 16 have slots 17 therein, (see Fig. 2,) which receive pins 18, fastened in the frame-plates 15, thus pivotally mounting the side cutting-arms. Said side cutting-arms are located one at each side of the frame outside of the walls 15 and lie, respectively, against the outer sides of two opposite walls 12, the arms 16 being capable of sweeping across the open end of the cutter. In order to cause the free ends of the arms 16 to move in a straight line, said arms are provided with pins 19, which work in slots 20, formed in the walls 15, the slots being arc-shaped, as will be understood from my prior patent, No. 802,742, dated October 24, 1905. Said arms 16 are joined by a fork 20', terminating in a handle 21, and the fork 20' is provided with adjustable pins 22, over which the ends of a cutting-wire 23 are wound, so that by means of said pins the tension of the wire may be regulated. This wire extends across between the free ends of the arms 16, so that it may sweep in a straight line across between the ends of the side walls 12, all of which will be understood from my prior patent before referred to. In order to lock the arms 16 in the central position, (shown in Fig. 1,) I provide two spring-catches 24, which are fastened to the inner sides of the walls 15 and operate through openings 25 in said walls, as shown best in Figs. 2, 4, and 5. Said spring-catches are adapted to engage the side cutting-plates 16 and hold them in the central position referred to, the cutting-wire 23 then taking the position shown in Fig. 7.

Adapted to embrace the base of the tubular handle 14 are two clamp members 26. (Best shown in Fig. 3.) These clamp members are connected by screws 27, by means of which the necessary pressure may be applied to hold the clamp members firmly in place, and said members carry a cutting-wire 28, which extends across between the outer ends of the side walls 12, at the middle of the width thereof, so that when the arms 16 are adjusted as shown in Figs. 1 and 3 the butter-entrance to the cutter is occupied by the two crossing wires, which will cut the butter into four distinct classes as it enters the space between the parts 16 and 12. Said clamps 26, with their wire 28, may be removed at will.

Operating between the walls 12 is a plunger 29, which is attached to the rod 30, passing loosely through a tube 31, which in turn is fitted loosely in the tubular handle 14. Said handle 14 and the tube 31 are provided with slots 32 and 33, respectively, these slots being opposite each other to accommodate the tang 34 of a handle 35, which is attached to the upper end of the rod 30. The tubular handle 14 is provided with an enlarged lower portion 14$^a$, in which a spring 36 is arranged, this spring bearing against the body or frame member 10 and being adapted to be struck by the tang 34 of the handle 35 when the handle reaches the end of its inward movement, providing a cushion to prevent extreme movement of the handle. The tube 31 is adapted to limit the inward movement of the plunger 29, and said tube is threaded at its upper end and engaged in an internally-threaded sleeve 37, which projects through the cross member 38 of the handle 14 and is provided at its outer end with a thumb-nut 39, facilitating the turning of the screw. Said sleeve has an annular bead 40 working in a corresponding cavity in the handle 38, which prevents longitudinal movement of the sleeve, and therefore when the sleeve is turned the tube 31 will be adjusted along the length of the handle 14, this sleeve projecting into the space between the walls 12 to engage the follower 29 and limit the inward movement thereof. In this manner I may regulate the amount of butter which is entered into the cutter for the purpose of adjusting the weight of the butter.

The sleeve 31 is fitted with an indicator-pin 41, which projects into a longitudinal slot 42 of the tubular handle 14 and is adapted to read against a scale 43, which is secured to the other end of the said handle. The handle is provided at opposite sides of the slot 32 with stop-shoulders 44, and these are adapted to be engaged by a catch 45, which is fastened, by means of a yoke and thumb-screw 46, to the handle 35, so that it will be in a position to engage or go clear of the shoulders 44, as desired. By adjusting the catch inward so that it will strike the shoulders 44 the return movement of the member 34 will be stopped half-way, and thus the device may be adjusted to separate or cut a pound of butter. If desired, the sleeve 37 need not pass clear through the cross member 38 of the handle 14; but the thumb-knob 39 may be made to pass out through an opening 47 in the said handle, as shown in Figs. 8 and 9.

In the use of the invention the sleeve 37 should be adjusted as desired, or if but half a pound is to be measured off the catch 45 should be moved in so that upon the return movement of the plunger it will again strike the shoulders 44. The device should then be forced into the mass of butter and the handle 21 operated to sever the print or block, all of which will be understood from the prior art. Should it be desired to form the butter in small blocks or sections for use in hotels or restaurants, the arms 16 should be moved to their central position and the catches 24 allowed to lock the arms. Then the clamps 26 should be applied and the wire 28 stretched across between the ends of the walls 12. Then as the device is plunged into the mass of butter it will be seen that the butter entering between the walls 12 will be severed into four separate sections. When this has been done, the catches 24 should be released and the handle 21 operated to cut off these sections from the mass of butter. Then the device should be withdrawn, and by alternately advancing the plunger 29 and operating the handle 21 small blocks or sections of any desired thickness may be cut off from the butter in the device.

Having thus described the preferred form of my invention, what I actually claim, and desire to secure by Letters Patent, is—

1. A butter-cutter adapted to be introduced into a mass of butter to separate a part thereof, a cutting-wire, means for moving said wire across the butter-cutter for the purpose specified, and means independent of the moving means for holding the wire in central position.

2. A butter-cutter adapted to be introduced into a mass of butter to separate a part therefrom, a cutting-wire, means for mounting said wire to move across the butter-cutter for the purpose specified, and catches for releasably holding said cutting-wire in central position.

3. A butter-cutter adapted to be introduced into a mass of butter to separate a part therefrom, a cutting-wire, means for mounting said wire to move across the butter-cutter for the purpose specified, catches for releasably holding the said cutting-wire in central position, and means for removably holding a second cutting-wire across the first cutting-wire.

4. A butter-cutter having a cutting-wire, swinging arms mounting the same, and releasable catches for holding said arms in a central position.

5. A butter-cutter having opposite side cutting-walls, side arms arranged at the sides of the cutting-walls, a cutting-wire held by said side arms, means for releasably holding the arms in a central position, a clamp releasably connected with the device, and a second cutting-wire held by the clamp across the first-named wire.

6. A butter-cutter having cutting-walls, a plunger, an operating-rod therefor, a tubular stop adapted to engage the plunger, and means for adjusting the position of the stop.

7. A butter-cutter having cutting-walls, a plunger, an operating-rod therefor, a tubular stop adapted to engage the plunger, and means for adjusting the position of the stop, said means comprising a screw member engaged with the tubular stop.

8. A butter-cutter comprising cutting-walls, a tubular handle, a follower, an operating-rod attached to the follower and extending into the handle, a tubular stop embracing the operating-rod and located in the handle, the stop being adapted to be engaged by the follower, and a threaded sleeve engaged with said tubular stop and having a portion exposed at the end of the handle.

In testimony whereof I have signed my name to this specification in the presence of two subscribing witnesses.

GOTTFRID ERICSON.

Witnesses:
 ISAAC B. OWENS,
 JNO. M. RITTER.